US008700285B2

United States Patent
Barlsen et al.

(10) Patent No.: US 8,700,285 B2
(45) Date of Patent: Apr. 15, 2014

(54) CONTROL DEVICE AND METHOD FOR SIGNALING A BRAKING PROCESS AT A TRAILER VEHICLE

(75) Inventors: Holger Barlsen, Langenhagen (DE); Tobias Lange, Bergheim (DE); Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/508,468

(22) PCT Filed: Nov. 11, 2010

(86) PCT No.: PCT/EP2010/006869
§ 371 (c)(1),
(2), (4) Date: Jul. 17, 2012

(87) PCT Pub. No.: WO2011/072780
PCT Pub. Date: Jun. 23, 2011

(65) Prior Publication Data
US 2012/0283925 A1    Nov. 8, 2012

(30) Foreign Application Priority Data

Aug. 19, 2001  (DE) .................. 10 2010 034 745
Dec. 18, 2009  (DE) .................. 10 2009 058 814

(51) Int. Cl.
*B60T 7/16* (2006.01)
*G08B 21/00* (2006.01)

(52) U.S. Cl.
USPC .................. 701/70; 701/2; 340/431

(58) Field of Classification Search
None
See application file for complete search history.

(56) References Cited

U.S. PATENT DOCUMENTS

| 5,251,966 | A  | * | 10/1993 | Friederichs et al. ............ 303/7 |
| 6,179,390 | B1 | * | 1/2001 | Guzorek et al. ............... 303/7 |
| 6,264,286 | B1 | * | 7/2001 | Ehrlich et al. ................ 303/7 |
| 6,669,311 | B2 |   | 12/2003 | Holst et al. |
| 6,845,851 | B1 | * | 1/2005 | Donaldson et al. .......... 188/3 H |
| 8,082,086 | B2 |   | 12/2011 | Heise et al. |
| 2003/0168908 | A1 | * | 9/2003 | Robinson et al. ............. 303/7 |
| 2004/0090118 | A1 | * | 5/2004 | Stummer ................... 303/191 |
| 2004/0119334 | A1 | * | 6/2004 | Lenz et al. ................. 303/146 |

(Continued)

FOREIGN PATENT DOCUMENTS

| DE | 10130544 A1 * | 1/2003 |
| DE | 101 56 673 A1 | 5/2003 |
| DE | 10 2007 054 189 A1 | 5/2009 |

OTHER PUBLICATIONS

Bosch, Kraftfahrtechnisches Taschenbufh (Bosch Automotive Manual), 26th Edition, 2007, pp. 904 and 906.

*Primary Examiner* — Behrang Badii
*Assistant Examiner* — Demetra Smith-Stewart
(74) *Attorney, Agent, or Firm* — Kramer Levin Naftalis & Frankel LLP (57) ABSTRACT

The invention relates to a control device and method for signaling a braking process at a trailer vehicle. The control device determines at least one braking value that is assigned to the braking process, and actuates at least one brake light as a function of the braking value. The braking process is signaled differently for different braking values determined by the control device during a braking process. As a result, traffic following the trailer vehicle and/or an emergency braking situation can be signaled and, therefore, safety in road traffic can be increased.

16 Claims, 2 Drawing Sheets

(56) References Cited

U.S. PATENT DOCUMENTS

| | | |
|---|---|---|
| 2005/0127747 A1* | 6/2005 | Robertson .................... 303/20 |
| 2006/0049686 A1* | 3/2006 | Bess et al. .................... 303/7 |
| 2007/0241874 A1 | 10/2007 | Okpysh et al. |
| 2008/0143179 A1* | 6/2008 | Rutherford .................. 303/160 |
| 2008/0177454 A1* | 7/2008 | Bond et al. ................... 701/70 |
| 2008/0257656 A1* | 10/2008 | Skinner et al. ............ 188/1.11 E |
| 2008/0309156 A1* | 12/2008 | Kissel ........................ 303/20 |
| 2009/0082935 A1* | 3/2009 | Leschuk et al. ............... 701/70 |
| 2009/0120747 A1* | 5/2009 | Heise et al. .................. 188/3 H |
| 2009/0219148 A1* | 9/2009 | Thomas et al. ............... 340/431 |
| 2010/0152920 A1* | 6/2010 | McCann ...................... 701/2 |
| 2010/0262368 A1* | 10/2010 | Kaminski .................... 701/213 |

\* cited by examiner

CONTROL DEVICE AND METHOD FOR SIGNALING A BRAKING PROCESS AT A TRAILER VEHICLE

FIELD OF THE INVENTION

The present invention generally relates to a control device and method for signaling a braking process at a trailer vehicle.

BACKGROUND OF THE INVENTION

Trailer vehicles can be braked in an electronically open-loop or closed-loop controlled fashion using an electronic brake system ("EBS"). Electronic brake systems are usually used in vehicles, in particular utility vehicles, such as trucks, and have, inter alia, the function of controlling brake cylinders or other brake application devices of a service brake installation of the vehicle at all the axles of the vehicle when a brake pedal is activated. Brakes to which the brake cylinders are assigned respond simultaneously and uniformly. With electronic brake systems it is possible to shorten a braking distance of the vehicle and at the same time achieve uniform wear of brake linings. The electronic brake system can actuate the pneumatically operating brake cylinders or service brake devices electronically. Flow times for a buildup of pressure or reduction in pressure are reduced and reaction times of the brake system are shortened in this context.

Known electronically closed-loop controlled brake systems, cf. Bosch, Kraftfahrtechnisches Taschenbuch [Bosch automotive manual], 26$^{th}$ edition, page 904, include a control device and pressure controlling modules, which are connected in a signal-transmitting fashion to the control device, and to which brake devices of the vehicle are assigned. In this context, it is possible to arrange one or more control units in a decentralized fashion. If an input signal relating to a braking request is present at the control unit, the pneumatic control pressures that are present at a control pressure line, which conducts a redundancy pressure, are shut off in the pressure controlling modules. The electronic control unit determines a brake setpoint pressure as a function of a deceleration request and further vehicle parameters. This brake setpoint pressure is transmitted to the brake controlling modules. The brake controlling modules apply the brake setpoint pressure to the brake cylinders on an axle basis or wheel basis.

For trailer vehicles, trailer control modules are known, cf. Bosch, automotive manual, 26$^{th}$ edition, page 906, that permit the trailer control pressure to be controlled in accordance with the functional requirements of the electronic brake system. A method for operating an electronically controlled pressure medium brake installation is known, for example, from DE 101 56 673 A1.

In addition, both known towing vehicles and known trailer vehicles have light systems for signaling braking processes. Brake lights of the light system of the trailer vehicle can be actuated as brake lights of the towing vehicle. An electrical connection for this purpose can utilize a standardized plug-type connection according to ISO 12098 between the towing vehicle and the trailer vehicle.

In order to inform traffic following the vehicle about the severity of a braking operation, an adaptive brake light, or the modulation of an emergency brake light, is known for towing vehicles. In this case, the control unit of the electronically closed-loop controlled brake installation in the towing vehicle carries out an emergency braking evaluation, wherein available vehicle parameters are evaluated and in response thereto it is decided whether an emergency braking situation is present. This rules out the possibility of hazardous situations arising for the following car traffic as a result of incorrect indication of emergency braking of the towing vehicle. If an emergency braking situation is detected, it is displayed by means of the adaptive brake light or the emergency brake light of the towing vehicle, and the following traffic is correspondingly informed or warned about the severity of the braking operation.

However, if the towing vehicle tows a trailer vehicle, in particular a semitrailer or drawbar trailer, the emergency brake light on the towing vehicle for indicating emergency braking to the following traffic cannot be seen since it is covered by the trailer vehicle. In emergency braking situations of vehicle trains, which have the towing vehicle and at least one trailer vehicle, hazardous traffic situations may therefore occur even if the towing vehicle is equipped with an adaptive brake light. It may not be possible to couple a brake light on the trailer vehicle to the adaptive brake light or the emergency brake light of the towing vehicle since the above-mentioned plug-type connection according to ISO 12098 between the towing vehicle and the trailer vehicle does not provide the necessary connection facility.

DE 10 2007 054 189 A1 discloses a brake control module for a trailer vehicle that actuates warning lamps and/or brake lights of a trailer vehicle having this brake control module. For this purpose, the brake control module is actuated by the towing vehicle via a towing vehicle-warning lamp interface provided for this purpose. A disadvantage of this actuation process is that it therefore requires specific interfaces to be provided both on the towing vehicle and on the trailer vehicle, which interfaces do not correspond to the standard. As a result, trailer vehicles that have a brake control module according to DE 10 2007 054 189 A1 are not able to be coupled to towing vehicles with standardized interfaces and operated therewith. Furthermore, although the brake lights of the trailer vehicle are actuated by this known brake control module, additional actuation of an adaptive brake light or of an emergency brake light by this brake control module is not provided and/or does not appear possible without once more expanding the interfaces between the towing vehicle and the trailer vehicle. The following traffic is therefore not informed about an emergency braking operation either.

SUMMARY OF THE INVENTION

Generally speaking, it is an object of the present invention to improve safety in road traffic during operation of a trailer vehicle.

Accordingly, control devices and methods for signaling a braking process at a trailer vehicle are disclosed. In particular, data and/or signals that are available at the trailer vehicle can be evaluated by a control device that is also arranged on the trailer vehicle. The data and/or signals can permit conclusions to be drawn about a braking process, including a severity level and/or other characteristic features of the braking process such as whether the process included an automatic braking intervention. In response, and in particular in the case of a detected emergency braking operation and/or in the case of a detected automatic braking intervention, the control device can actuate at least one existing or additional brake light of the trailer vehicle in such a way that the following traffic can draw conclusions about the braking process, including, for example, conclusions about the severity and/or other features of the braking process, such as whether the braking process included an emergency braking operation, from the lighting up of the brake lights.

The actuation of the brake lights is therefore not carried out by the towing vehicle and not carried out by means of control instructions that are received from the towing vehicle. Instead, the control device at the trailer vehicle decides automatically whether, for example, an emergency braking operation is present, and the control device correspondingly actuates the brake lights with the result that the following traffic is warned. There is no need to provide any additional interfaces between the towing vehicle and the trailer vehicle for this purpose. In trailer vehicles that are equipped according to the invention, the method according to the invention can therefore be carried out in conjunction with any towing vehicle that has a standardized interface and, in particular, an electronic brake system and is equipped to tow a trailer vehicle that can be operated with an electronic brake system.

According to an embodiment of the inventive method a control device, which is arranged on a trailer vehicle, determines at least one first braking value that is assigned to a first braking process. The braking value can represent a severity level of the braking process or other features that characterize the braking process. Additionally, the control device can actuate at least one brake light of a light system as a function of this braking value such that the braking process is signaled differently at the trailer vehicle compared with a signaling operation in the case of at least one second braking value that can be determined by the control device during a second braking process. A severity level of the first braking process, which is assigned to the respective first braking process and/or the first braking value, can be a selected or determined deceleration of the trailer vehicle, a towing vehicle towing the trailer vehicle, or of a vehicle train having the trailer vehicle and the towing vehicle. The control device preferably has an emergency brake signal output for actuating the light system.

According to some embodiments, the control device is a control center of an electronic brake system of the trailer vehicle and, in addition to controlling the brake light or the emergency brake signaling operation, it can also control the electronic brake system at the trailer vehicle. As a result, control functions for the brake light and/or for the emergency brake signaling operation can be integrated into the control center of the electronic brake system, which is present in any case at the trailer vehicle. This arrangement is advantageous because in this control center there are the signals and/or data that are advantageously extracted for open-loop and/or closed-loop control functions of the electronic brake system. These signals and/or data can be used, at least partially, and if appropriate, together with further input variables for detecting particular brake situations, in particular an emergency braking operation, for actuating the brake light or emergency brake signaling operation.

According to some embodiments, the control device includes a receiver for receiving data and/or signals transmitted from a towing vehicle towing the trailer vehicle to the trailer vehicle via a databus, (e.g., a controller area network ("CAN") databus). These data and/or signals can be used by the control device to determine a braking value. Alternatively or additionally, the control device can use signals and/or data received from devices at the trailer vehicle (e.g., sensors) to determine a braking value.

According to some embodiments, the control device actuates the brake light via a databus. The control device is therefore connected via a databus to a device of a light system of the trailer vehicle, which can, in turn, actuate the brake lights.

According to some embodiments, the control device can switch an output stage that actuates the brake light. Actuation can be carried out directly or indirectly, for example by means of a relay. After the output stage has been actuated, for example via the abovementioned databus, the currents that are required to actuate the brake light can be made available by the output stage. The control device can therefore be configured for comparatively low currents.

According to some embodiments, the control device actuates the brake light, which may be an emergency brake light, via optical cabling. The optical cabling may also allow the brake light to be actuated by the towing vehicle. Optical cabling for actuating the brake light or an emergency brake light can therefore be integrated into the existing optical cabling at the trailer vehicle. This arrangement reduces cost since there is no need to provide any additional optical cabling to practice the invention.

According to some embodiments the control device can use one or more variables, (e.g., data and/or signals) to determine the braking value. The variables can be determined at the towing vehicle, the trailer vehicle for the towing vehicle, or for a vehicle train having the towing vehicle and the trailer vehicle.

According to some embodiments, a variable can represent at least one actual speed, although using at least two actual speeds may be preferable. Alternatively or additionally, a variable can represent one actual deceleration. Both the actual speed and the actual deceleration may be an estimated or measured variable. For example, wheel sensors can measure actual speeds at wheels of the trailer vehicle and determine a decrease in the speed through comparison of such actual speeds determined at various times, or actual speeds at different wheels can be compared with one another. Hazardous driving situations that require an automatic braking intervention can be determined in the process. In such situations it may be appropriate to output an emergency brake signal.

Further variables for determining the braking value, which may be used as an alternative or in addition to the above-referenced variables, can include at least one setpoint deceleration and/or at least one braking request signal. One of these two variables can be transmitted to the trailer vehicle from the towing vehicle. The setpoint deceleration may be a variable that is calculated or determined by using the brake request signal.

Alternatively or additionally, a variable that is used to determine the braking value can be an information item relating to an automatic braking intervention (e.g., by the trailer vehicle). This information may be, for example, a dimension variable that brings about the braking intervention. Alternatively, the information may also be a variable that is influenced in response to an automatic braking intervention or indirectly by the automatic braking intervention. Variables that are used to determine the braking value may be acquired from interventions by functions of the control device, such as, for example, functions of an anti-lock brake system ("ABS"), a traction control system, or an electronic stability program ("ESP").

Alternatively or additionally, information relating to what is referred to as an RSS braking operation (i.e. a braking operation using a roll stability support (RSS) system or a system that counteracts lateral tilting) may be used to determine the braking value. In the case of a detected RSS braking operation (e.g., at the trailer vehicle) or, in the case of another automatic braking intervention, an emergency braking operation can be signaled and/or the braking process can be signaled differently compared to a braking operation without RSS deployment or automatic braking intervention. In particular, the brake light or emergency brake light can signal an emergency braking operation or hazardous situation in response to the automatic braking intervention at the trailer vehicle by means of the RSS system. In response to the automatic braking intervention, a braking value is in fact determined, which in turn brings about actuation of the brake light in order to signal the emergency braking operation.

Information used to determine the braking value can also include vehicle data such as wheel speeds, load state information, and sensor data of a sensed lateral acceleration. The load state information may be, for example, determined using a load sensor, using braking processes, or the load state information may be input manually. All this information may be used alone or together even without RSS deployment in order to determine the braking value. In particular, the braking value or values can be determined using at least one variable sensed at the trailer vehicle, at the towing vehicle, or at the vehicle train, or sensor signals or sensor data (e.g., of a sensed lateral acceleration).

According to some embodiments, the control device can actuate the brake light adaptively in accordance with a respective braking value. In particular, an additional emergency brake light of the light system at the trailer vehicle, but alternatively also a brake light that is used during a normal braking operation, can be actuated adaptively by the control device. As a result, the following traffic is informed that an emergency braking operation is occurring. If appropriate, the following traffic is additionally informed about the severity of the emergency braking operation. For example, the brake light can alternately light up with a frequency as a function of the respective braking value and not light up again or light up with a different luminosity.

According to some embodiments, the control device can compare a braking value with a limiting value. The limiting value may be a predetermined, determinable, or settable limiting value. The control device can include a memory in which the limiting value or values are stored. The control device can determine the respective braking process as an emergency braking operation in response to it being detected that the limiting value is reached, exceeded, or undershot. In response to a detected emergency braking operation, an emergency brake signal can be generated and is made available via an emergency brake signal output (e.g., an output stage connected upstream of the brake light). A braking process that is detected as an emergency braking operation can be signaled differently (e.g., through actuation of the emergency brake light or through the emergency brake signaling operation) than a braking process that is not detected as an emergency braking operation. If appropriate, a braking process that is detected as an emergency braking operation may also be signaled differently than another braking process that is also detected as an emergency braking operation, though during which another braking value was determined and another limiting value was not reached, was reached, or was exceeded.

The control device can signal a first braking process differently compared with another braking value, which can be determined during a second braking process. In particular, the first braking process (e.g., for an emergency braking operation) can be signaled by one or more of the functions described below.

A first exemplary function for signaling a first braking process differently than a second process can include lighting up the brake light more brightly. In particular, the brake light can be a normal brake light by means of which comparatively weak braking can also be signaled.

A second exemplary function can include alternatively or additionally actuating and lighting up at least one additional brake light (e.g., an emergency brake light). This brake light can, if appropriate, also light up with differing degrees of brightness depending on the braking value that is determined. The emergency brake light is, for example, designed to emit an adaptive brake light.

A third exemplary function can include alternatively or additionally cyclically lighting up the brake light or emergency brake light. For this purpose, the brake light can be actuated in such a way that this brake light automatically switches a light, such as at least one filament light and/or an LED, on and off in an alternating fashion, and/or is energized alternately and interrupts an electric line. For this purpose, the brake light can include, for example, a relay and/or an electronic circuit.

A fourth exemplary function can include cyclically actuating an existing and/or additional brake light or emergency brake light. The cyclical actuation is carried out here with a fixed or variable frequency, wherein the frequency can be set manually or automatically. For example, the frequency can be set automatically as a function of the braking value that is determined.

According to some embodiments, the control device can switch a relay, which can interrupt actuation of the brake light by the towing vehicle continuously or cyclically for a finite time period or until actuation can be switched over to another actuation operation. For example, during an emergency braking operation a brake light may not actuated by the towing vehicle but rather by the control device in order to be able to allow this brake light to light up more brightly. In the case of the cyclical interruption of the actuation by the towing vehicle, the brake light may, for example, not be lit up during these interruptions or may be actuated by the control device of the trailer vehicle in a different way or in such a way that it lights up more brightly or more darkly than usual during these interruptions.

According to some embodiments the control device can include hardware components and/or software components for carrying out steps of the method according to embodiments of the invention for signaling a braking process.

A light system can be provided for signaling a braking process at a trailer vehicle having this light system. The light system can include at least one brake light and a control device according to the as described above, which can actuate the brake light(s).

According to some embodiments, the light system can include a databus for transmitting signals and/or data from a towing vehicle towing the trailer vehicle to the trailer vehicle.

The light system can also an output stage by means of which the brake light can be actuated directly or indirectly.

The light system can also include optical cabling via which the brake light can be actuated both from the towing vehicle and from the control device.

A trailer vehicle brake installation, according to some embodiments, can include an electronic brake system ("EBS") and a control device as disclosed herein. In addition, the trailer vehicle brake installation can include at least one brake activation control module connected in a signal-transmitting fashion to the control device. The brake activation control module can be, for example, a valve device or a modulator, which can control a pneumatic or hydraulic pressure.

In addition, the trailer vehicle brake installation can include at least one brake activation device connected electrically, pneumatically or hydraulically to the brake activation control module. At least one wheel, assigned to this brake activation device, of a trailer vehicle having the trailer vehicle brake installation can be braked in response to at least one electrical signal received at the control device. The brake activation device may be, for example, a brake cylinder that can be activated pneumatically or hydraulically. Alternatively, the brake activation device can also be an actuator of a brake that can be activated electrically.

The trailer vehicle brake installation can include an interface with the databus between the towing vehicle and the trailer vehicle, with the result that signals or data are transmitted by the towing vehicle through the databus, via the interface with the control device of the trailer vehicle, and are used there both for actuating the brake activation device and for the detection of emergency braking and/or the determination of the braking value and signaling of the respective braking process.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWINGS

Further advantageous embodiments can be found in the claims and in the exemplary embodiments, which are explained in more detail with reference to the drawings, in which:

DETAILED DESCRIPTION OF THE PREFERRED EMBODIMENTS

Figure 1:
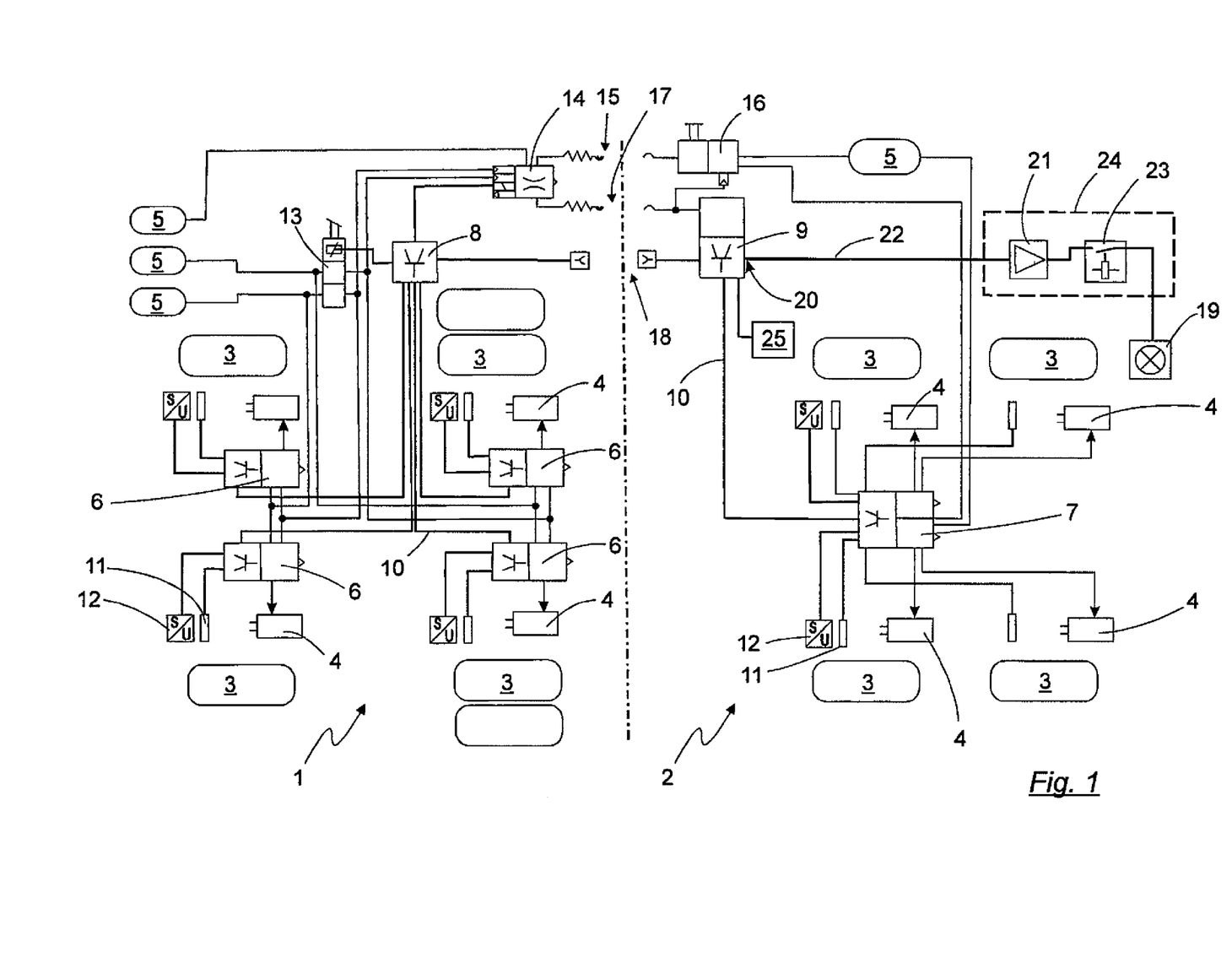
FIG. 1 is a pneumatic and electrical circuit diagram of a brake installation having an electronically closed-loop controlled brake system (EBS) in accordance with an embodiment of the present invention.

Referring now to the drawing figures, where the same reference numerals are used for corresponding elements, FIG. 1 shows a pneumatic and electrical circuit diagram of a brake installation having an electronic brake system (EBS) in a vehicle train composed of a towing vehicle 1 and trailer vehicle 2. The electrical lines of the electronic brake system are shown with thicker lines than the pressure medium lines, in particular pneumatic and/or hydraulic lines, in the circuit diagram.

All the wheels 3 both of the towing vehicle 1 and the trailer vehicle 2 are respectively assigned a brake cylinder 4, as a brake activation device, which is activated by a pressure medium and is operated, in particular, pneumatically or hydraulically. Pressure medium containers 5, in particular compressed air containers, are provided both in the towing vehicle 1 and in the trailer vehicle 2 in order to supply the brake cylinders 4.

The pressure medium activation, in particular pneumatic or hydraulic activation, of the brake cylinders 4 is carried out by means of pressure closed-loop control modules 6, 7 which are each connected in a signal-transmitting fashion to a control device or a control unit 8, 9 via a brake Controller Area Network (CAN") bus 10. In the towing vehicle 1, the wheels 3 are each assigned 1-channel pressure closed-loop control modules 6. A brake activation control module or 2-channel pressure closed-loop control module 7, which supplies the brake cylinders 4 of all the wheels 3, is provided in the brake system of the trailer vehicle 2. However, it is also possible to assign separate pressure closed-loop control modules on a wheel basis or axle basis to each wheel 3 for the trailer vehicle 2.

A service brake valve 13 is connected as a signal generator to the brake installation which can be activated by pressure medium and is, in particular, a pneumatic and/or hydraulic brake installation, the accelerator pedal of which can be activated by the driver of the towing vehicle. When the accelerator pedal moves, a signal is generated which represents a braking request, and said signal is input into the control unit 8 of the towing vehicle 1. The pneumatic devices of the trailer vehicle 2 are connected to the towing vehicle 1 via a trailer control valve 14 which, on the one hand, is connected via a supply coupling head 15 to a trailer brake valve 16 and to a downstream pressure container 5 of the trailer vehicle 2. On the other hand, the trailer control valve 14 is connected via a brake coupling head 17 to the control unit 9 of the brake installation in the trailer vehicle 2.

When the service brake valve 13 is activated, the control unit 8 in the towing vehicle calculates the braking request of the driver, wherein at the same time backup actuating devices which are provided in the pressure closed-loop control modules 6 are activated and the pneumatic control pressures are shut off. The control unit 8 calculates, as a function of the braking request and available operating variables such as vehicle mass and instantaneous operating load, the setpoint braking pressure which is predefined to the pressure closed-loop control modules 6 via the respective brake CAN bus 10.

The trailer vehicle 2 has a separate electronic brake system which comprises a control unit as a central control device. The control unit 9 of the trailer vehicle 2 determines the setpoint braking pressure for the connected pressure closed-loop control module 7 on the basis of the input signals for said trailer vehicle 2. In this context, the input signal which represents a braking request is predefined by the control unit 8 of the towing vehicle. The control units 8, 9 of the towing vehicle 1 and/or of the trailer vehicle 2 are connected to one another for this purpose via a trailer CAN bus 18 according to ISO 11992. The control unit 9 calculates, as a function of the detected braking request and/or other available operating variables, the setpoint braking pressure for the brake cylinders 4, which setpoint braking pressure is predefined to the pressure closed-loop control module 7 via the brake CAN bus 10.

In the case of vehicle trains which do not have a data interface ISO 11992, another available variable for representing the braking request can be predefined to the control unit 9 of the trailer vehicle instead of the predefined setpoint value from the towing vehicle. The setpoint value can be predefined, for example, by a pressure sensor of the trailer control valve 14 which measures the control pressure for the trailer vehicle. Alternatively, the setpoint value can also be specified by pressure sensors arranged to a trailer vehicle.

A service brake lighting system on the rear side of the trailer vehicle 2 in the direction of travel of the vehicle train is coupled via a plug-type connection (not illustrated) according to ISO 12098 to the lighting system of the towing vehicle 1, with the result that lighting up of the brake lights of the towing vehicle 1 is connected through to the trailer vehicle 2.

The control unit 9 in the trailer vehicle 2 determines at least one braking value assigned to the respective braking process and compares said braking value with a limiting value stored in a memory of the control unit 9. As a result, the control unit 9 carries out, in particular, an emergency braking detection process and causes an emergency braking signal function to be activated if an emergency braking situation is detected. In this context, an emergency brake light 19 is switched on in order to indicate, on the rear side of the trailer vehicle 2, the emergency braking situation to the following traffic by lighting up the brake light 19. In this case, an emergency braking signal output 20 of the control unit 9 is connected to an energy source, in the present exemplary embodiment an output stage 21, via a control line 22. The output stage 21 outputs a corresponding electrical signal for the emergency brake light 19 when actuation is carried out by the control unit 9 with an emergency braking signal.

Flashing of the emergency brake light 19 can be set by correspondingly changing the parameterization of the control unit 9.

In the exemplary embodiment shown, a relay 23, which ensures that the emergency brake light 19 flashes, is arranged between the output stage 21 and the emergency brake light 19. The relay 23 can, if appropriate, be switched via a databus (not illustrated) or via a further control line from the control unit 9. The output stage 21 actuates the emergency brake light 19 via the relay 23. The output stage 21 and the relay 23 therefore form an emergency brake circuit 24 which is connected to the brake system via the control unit 9, and switches on the emergency brake light 19 when an emergency braking situation is detected.

The emergency brake light 19 for indicating the emergency braking situation is provided as a separate brake light, in addition to the operational lighting system of the trailer vehicle 2 on the rear side thereof. Alternatively, it is also conceivable to actuate the service brake lighting system of the trailer vehicle 2 by means of the emergency brake circuit 24, or the actuation of the emergency brake light 19 is integrated into the service brake lighting system. In particular, the emergency brake light 19 can be a brake light which, during every normal braking process, is actuated by the usual service brake lighting system via the plug-type connection (not illustrated) according to ISO 12 098 and an electrical line from this plug-type connection to the relay 23, wherein the output stage 21 can be dispensed with and/or is arranged in the towing vehicle. However, it is alternatively also possible to provide a control line via which the service brake lighting system actuates the output stage 21.

In these alternative embodiments, the relay 23 can be switched via the control line 22 which connects the controller 9 to the relay 23 in these cases and/or via another control line (not illustrated). The control line 22 and/or this other control line are preferably embodied as a bus connection via which control data for switching the relay are transmitted. The relay 23 interrupts the actuation of the emergency brake light 19 by the service brake lighting system cyclically or for as long as an emergency braking situation is present. Actuation of the emergency brake light 19 and/or of a usual brake light is interrupted here or the actuation shown in FIG. 1 is switched over to. If appropriate, two relays are also provided here, wherein one relay (not illustrated) performs the switching over and the relay 23 ensures that the flashing occurs.

In order to detect an emergency braking situation, the control unit evaluates the internal available operating parameters of the vehicle. In this context, in addition to an input signal, which represents a braking request and is present via the CAN bus 18, the speed of the trailer vehicle and/or the actual or desired deceleration of the vehicle are used. When predefined limiting values are reached, the control unit 9 detects an emergency braking situation and activates the emergency braking signal function.

The brake light 19 for indicating the emergency braking situation is embodied as an adaptive brake light 19 and is actuated adaptively by the brake system on the basis of the evaluation of the variables taken into account. In this context, different signals are programmed in the control unit 9 depending on the intensity of the braking and/or braking deceleration.

The control unit 9 is configured to compare variables with comparison variables and/or at least one limiting value. These variables which are to be used for comparison may comprise one or more variables which are taken into account for determination of the setpoint braking pressure in the brake system. Variables which are to be used for the emergency braking detection and the emergency braking signal function which is implemented in the control unit are, in particular, the speed of the trailer vehicle 2, of the towing vehicle 1 or of the vehicle train and/or the actual or desired deceleration of the trailer vehicle 2, of the towing vehicle 1 or of the vehicle train. These variables are at least partially obtained from the towing vehicle 1 via the CAN bus 18 for the determination of the setpoint pressure for the brake system and/or acquired from the measured values of the measuring sensors on the trailer vehicle, for example the rotational speed sensors 11.

Further variables which can be used for the emergency braking signal function can be acquired from interventions via other functions of the control unit, such as for example anti-lock brake systems (ABS), traction control systems (TCS) or electronic stability programs (ESP). The static friction of the roadway, the measured values of the brake wear meters 12 or else the load of the vehicle or the load state can also be evaluated in the control unit for the determination of an emergency braking situation and activation of the emergency braking signal function. In addition, vehicle data such as wheel speed, load data and/or data and/or measured values relating to a lateral acceleration which are determined by means of a sensor integrated, in particular, into the control unit 9 and which are used for a tilting stability device or a roll stability support (RSS) may be employed as variables for the detection of the emergency braking.

In order to compare the operating variables used during the detection of emergency braking with predefined limiting values and to activate the emergency braking signal function when the predefined limiting values are exceeded, limiting values for the variables to be taken into account are stored in a memory 25 of the control unit 9.

Figure 2:
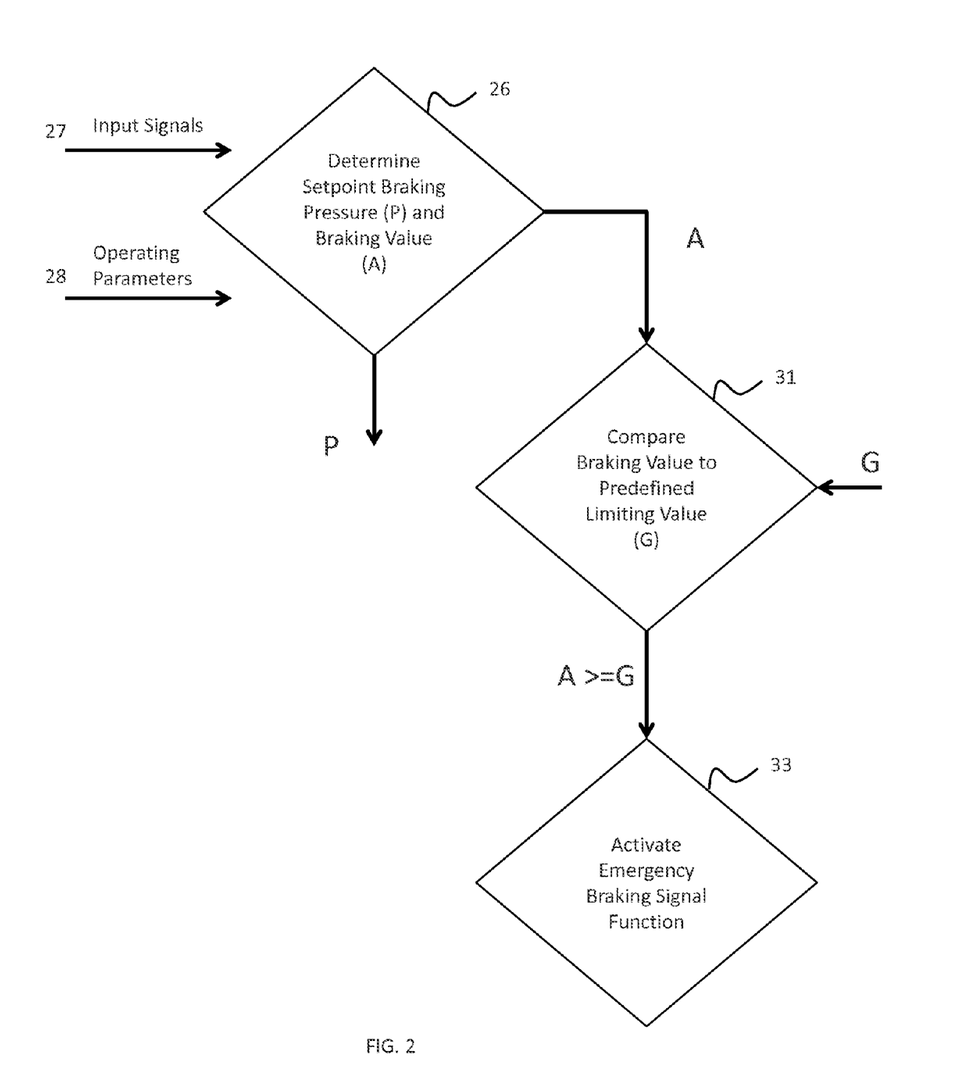
FIG. 2 is a schematic flowchart of an emergency braking signal function of an electronically closed-loop controlled brake system of a trailer vehicle according to FIG. 1.

FIG. 2 shows, in a schematic flowchart, a method of operation of the control unit with the emergency braking signal function implemented therein. A step 26 serves to acquire input values from received signals or data and to process said values, wherein a setpoint braking pressure 8 and at least one braking value (A) are determined. A signal which is received in such a way is the input signal 27 which represents the braking request and/or a setpoint deceleration. The input signal 27 is predefined to the control unit in the exemplary embodiment according to FIG. 1 via the control unit 8 of the towing vehicle. On the other hand, operating parameters 28 are acquired, in particular from the measured value generators of the trailer vehicle, and are fed to the control unit in signals or data.

A plurality of these acquired input values or all the acquired input values and/or values determined from a number of these input values or from all of these input values are evaluated and used as the basis for the determination of the setpoint braking pressure P for the trailer vehicle or for the determination of another variable according to which the brakes on the trailer vehicle are activated. Such input signals, which are used to determine the setpoint braking pressure P, can be, for example, a vehicle deceleration or an actual deceleration determined for the trailer vehicle, towing vehicle or vehicle train and/or the speed of the trailer vehicle.

At least one variable, which is one of the input signals 27 or 28 or a variable determined from at least one of these variables 27, 28, is used to determine the at least one braking value (A) or as a braking value (A) for the realization of the emergency braking signal function according to the invention. This braking value (A) is compared with at least one predefined limiting value (G) in a comparison step 31. If the braking value and/or one of the operating variables 29 that are used for the emergency braking signal function reaches or exceeds a limiting value (G) which is provided for it or them, the emergency braking signal function 33 is activated. In this context, a plurality of limiting values (G) can be provided for each braking value (A) that is used. A corresponding emergency braking signal is predefined here to each of the limiting values (G), with the result that the severity of the emergency braking operation of the trailer vehicle 2 can be indicated to the following traffic by means of the emergency brake light 19 (FIG. 1).

Hitherto it was impossible to actuate an adaptive brake light on the trailer vehicle by means of the electronic brake system of towing vehicles since the standardized, and to this extent obligatory, plug-type connections between the towing vehicle 1 and the trailer vehicle 2 did not permit such a transmission, but now by virtue of the control of an adaptive brake light 19 by the electronic brake system of the trailer vehicle 2 it is possible to indicate the emergency braking situation to the following traffic.

All the features specified in the description above and in the claims are capable of being used either individually or in any desired combination with one another. The disclosure of the invention is therefore not restricted to the described or claimed feature combinations. Instead, all feature combinations are to be considered as being disclosed.

It will thus be seen that the objects set forth above, among those made apparent from the preceding description, are efficiently attained, and since certain changes may be made in the above processes and constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for signaling a braking process at a trailer vehicle having
a control device and at least one brake light, the method comprising:
determining at least one first braking value assigned to a first braking process with the control device; and
actuating, with the control device, the at least one brake light as a function of the at least one first braking value such that the first braking process is signaled differently at the trailer vehicle compared with a signaling operation for at least one second braking value determined by the control device during a second braking process.

2. The method as claimed in claim 1,
further comprising using the control device to
control an electronic brake system of the trailer vehicle
determine the at least one first braking value based on one
of signals and data received from a towing vehicle via a databus;
actuate the at least one brake light via the databus;
switch an output stage, which actuates the at least one brake light; and
actuate the at least one brake light via optical cabling.

3. The method as claimed in claim 2, wherein
the control device uses at least one of the following variables to determine the at least one first braking value:
at least one actual speed;
at least one actual deceleration;
at least one setpoint deceleration;
at least one braking request signal;
at least one variable sensed at one of the trailer vehicle and the towing vehicle; and
at least one information item relating to an automatic braking intervention by the trailer vehicle.

4. The method as claimed in claim 2,
the method further comprising using the control device to:
(i) actuate the at least one brake light adaptively in accordance with the at least one first braking value with the control device; and
(ii) compare the first braking value with a limiting value and detect that the first braking process is an emergency braking operation based on whether the limiting value is one of reached, exceeded, and undershot; and
signaling the first braking process using at least one of:
lighting up the at least one brake light more brightly;
actuating and lighting up at least one additional emergency brake light as a brake light;
cyclically lighting up the at least one brake light, wherein the at least one brake light automatically switches a light of the at least one brake light on and off in an alternating fashion in response to actuation by the control device; and
cyclically actuating the at least one brake light, wherein the control device switches a relay that interrupts actuation of the at least one brake light by the towing vehicle for one of a finite time period and until switching over to another actuation operation.

5. The method as claimed claim 1,
further comprising, in response to an automatic braking intervention at the trailer vehicle by a stability system, actuating one of the at least one brake light and at least one additional emergency brake light to signal an emergency braking operation based on the at least one first braking value.

6. A control device for a trailer vehicle, the control device being configured to:
determine at least one first braking value, which is assigned to a first braking process; and
actuate at least one brake light of the trailer vehicle as a function of the at least one first braking value such that the first braking process is signaled differently at the trailer vehicle compared with a signaling operation for at least one second braking value determined by the control device during a second braking process.

7. The control device as claimed in claim 6,
the control device
being a control center of an electronic brake system at the trailer vehicle and
further comprising a receiver configured to receive one of data and signals transmitted from a towing vehicle via a databus in order to determine the at least one first braking value, wherein the control device is further configured to at least one of:
actuate the at least one brake light via the databus;
switch an output stage to actuate the at least one brake light; and actuate the at least one brake light via optical cabling run from a towing vehicle towing the trailer vehicle.

8. The control device as claimed in claim 7, wherein the control device is configured to use at least one of the following variables to determine the at least one first braking value:
- at least one actual speed;
- at least one actual deceleration;
- at least one setpoint deceleration;
- at least one braking request signal;
- at least one variable which is sensed at one of the trailer vehicle and the towing vehicle; and
- at least one information item relating to an automatic braking intervention by the trailer vehicle.

9. The control device as claimed in claim 6, wherein the control device is configured to:
- adaptively actuate the at least one brake light in accordance with the at least one first braking value;
- compare the at least one first braking value with a limiting value, the first braking process being detectable as an emergency braking operation in response to the limiting value being one of reached, exceeded, and undershot; and
- signal the first braking process differently compared to the second braking process by at least one of:
  - lighting up the at least one brake light more brightly;
  - actuating and lighting up at least one additional emergency brake light as a brake light;
  - cyclically lighting up the at least one brake light on and off in an alternating fashion in response to its actuation by the control device; and
  - cyclically actuating the at least one brake light by switching a relay with the control device such that actuation of the at least one brake light is one of interrupted for a finite time period and switched over to another actuation operation by means of the relay.

10. The control device as claimed in claim 9, wherein the control device is further configured to:
determine the at least one first braking value based on an automatic braking intervention at the trailer vehicle by a stability system, one of the at least one brake light and the at least one additional emergency brake light being actuated as a function of the at least one first braking value to signal an emergency braking operation based on the automatic braking intervention.

11. A light system for signaling a braking process at a trailer vehicle, the light system comprising:
- at least one brake light; and
- the control device as claimed in claim 6, which actuates the at least one brake light.

12. The light system as claimed in claim 11, further comprising:
- a databus configured to transmit one of signals and data from a towing vehicle to the trailer vehicle;
- an output stage configured to actuate the at least one brake light; and
- optical cabling via which the at least one brake light is actuated from at least one of the towing vehicle and the control device.

13. A trailer vehicle brake installation, comprising:
- an electronic brake system (EBS);
- a control device as claimed in claim 6; and
- at least one brake activation control module in communication with the control device, the at least one brake activation control module comprising at least one brake activation device connected one of electrically, pneumatically, and hydraulically to the at least one brake activation control module, wherein at least one wheel, assigned to the at least one brake activation device, of a trailer vehicle comprising the trailer vehicle brake installation is braked in response to one of at least one electrical signal received at the control device and data received at the control device, and wherein the control device comprises an interface with a databus through which the one of signals and data transmitted by a towing vehicle are received.

14. A trailer vehicle comprising a control device as claimed in claim 6.

15. A trailer vehicle comprising a light system as claimed in claim 11.

16. A trailer vehicle comprising a trailer vehicle brake installation system as claimed in claim 13.

* * * * *